US011709180B2

(12) United States Patent
Lee et al.

(10) Patent No.: US 11,709,180 B2
(45) Date of Patent: Jul. 25, 2023

(54) ATOMIC FORCE MICROSCOPE USING ARTIFICIAL INTELLIGENCE OBJECT RECOGNITION TECHNOLOGY AND OPERATION METHOD THEREOF

(71) Applicant: CHUNGBUK NATIONAL UNIVERSITY INDUSTRY-ACADEMIC COOPERATION FOUNDATION, Cheongju-si (KR)

(72) Inventors: Man Hee Lee, Cheongju-si Chungcheongbuk-do (KR); Jun Hong Park, Asan-si Chungcheongnam-do (KR)

(73) Assignee: CHUNGBUK NATIONAL UNIVERSITY INDUSTRY-ACADEMIC COOPERATION FOUNDATION, Cheongju-si (KR)

( * ) Notice: Subject to any disclaimer, the term of this patent is extended or adjusted under 35 U.S.C. 154(b) by 0 days.

(21) Appl. No.: 17/772,267

(22) PCT Filed: May 11, 2021

(86) PCT No.: PCT/KR2021/005882
§ 371 (c)(1),
(2) Date: Apr. 27, 2022

(87) PCT Pub. No.: WO2022/014838
PCT Pub. Date: Jan. 20, 2022

(65) Prior Publication Data
US 2022/0373575 A1 Nov. 24, 2022

(30) Foreign Application Priority Data

Jul. 14, 2020 (KR) .................. 10-2020-0087092
Sep. 3, 2020 (KR) .................. 10-2020-0112538

(51) Int. Cl.
*G01Q 20/02* (2010.01)
*G01Q 10/04* (2010.01)
*G06T 7/70* (2017.01)

(52) U.S. Cl.
CPC ............ *G01Q 20/02* (2013.01); *G01Q 10/04* (2013.01); *G06T 7/70* (2017.01); *G06T 2207/20081* (2013.01)

(58) Field of Classification Search
CPC .......... G01Q 20/02; G01Q 10/04; G06T 7/70; G06T 2207/20081
See application file for complete search history.

(56) References Cited

U.S. PATENT DOCUMENTS 8,887,311 B1 * 11/2014 Kirishima .............. G01Q 20/02
850/8
2007/0180889 A1 * 8/2007 Murayama ............. G01Q 30/06
250/252.1

(Continued)

FOREIGN PATENT DOCUMENTS

JP    2003-028772 A    1/2003
JP    2014-044075 A    3/2014

(Continued)

OTHER PUBLICATIONS

Atent Cooperation Treaty, International Search Report, Application No. PCT/KR2021/05882, dated Aug. 19, 2021, in 3 pages.

*Primary Examiner* — Nicole M Ippolito
(74) *Attorney, Agent, or Firm* — Procopio, Cory, Hargreaves & Savitch LLP (57) ABSTRACT

An atomic force microscope includes a sample stage on which a sample is placed, a cantilever including a probe tip, a laser radiating a laser beam to the cantilever, a photodetector receiving a laser beam reflected from the cantilever, a first camera photographing the sample and the cantilever, a second camera photographing the cantilever and the spot of (Continued)

the laser beam, and a processor electrically connected to the first and second cameras and the photodetector to process data acquired by the first and second cameras and the photodetector. An operation method of the atomic force microscope includes detecting the positions of the cantilever and the sample using the first camera, adjusting the position of the sample, detecting the positions of the laser and the cantilever using the second camera, aligning the laser, detecting the position of the laser beam using the photodetector, and aligning the position of the photodetector.

13 Claims, 10 Drawing Sheets

(56) References Cited

U.S. PATENT DOCUMENTS

2013/0143248 A1* 6/2013 Fernandez ............ G01Q 60/42
                                                                  435/23
2018/0259552 A1* 9/2018 Kobayashi ............ G01Q 20/02

FOREIGN PATENT DOCUMENTS

| KR | 10-1198178 B1 | 11/2012 |
| KR | 10-2015-0058596 A | 5/2015 |
| KR | 10-2018-0057567 A | 5/2018 |

* cited by examiner

ATOMIC FORCE MICROSCOPE USING ARTIFICIAL INTELLIGENCE OBJECT RECOGNITION TECHNOLOGY AND OPERATION METHOD THEREOF

CROSS-REFERENCE TO RELATED APPLICATIONS

This application is US National Stage of International Patent Application PCT/KR2021/005882, filed May 11, 2021, which claims benefit of priority from Korean Patent Applications KR 10-2020-0087092, filed Jul. 14, 2020 and KR 10-2020-0112538, filed on Sep. 3, 2020, the contents of all of which are incorporated herein by reference.

TECHNICAL FIELD

The present invention relates to an atomic force microscope and an operation method thereof. More particularly, the present invention relates to an automated atomic force microscope using artificial intelligence object recognition technology and an operation method thereof.

BACKGROUND ART

An atomic force microscope is a device that measures the shape of a sample by scanning the surface of the sample using a fine probe tip attached to an end of a cantilever. Such an atomic force microscope visualizes topography using a laser and a photodetector. The laser radiates a laser beam onto the end of the cantilever in order to detect movement of the cantilever. The laser beam reflected from the cantilever is input to the photodetector, and the input laser signal changes as the cantilever bends. As a result of scanning of the surface of the sample, an image visible to the naked eye is obtained.

A preparation process for driving the atomic force microscope includes the following three main steps: (i) laser-cantilever alignment, (ii) laser-photodetector alignment, and (iii) tip-sample access and scan.

Because the probe tip is damaged every time a sample is measured, it is necessary to periodically replace the probe tip. Whenever the cantilever is replaced, most commercial equipment requires an operator to manually perform laser-cantilever alignment, laser-photodetector alignment, and tip-sample access, which is time-consuming and results in non-uniform quality of final products due to the difference in accuracy in performing an alignment process between operators. Also, in the process of manually performing the tip-sample access, there is a risk of damage to parts such as the cantilever or the sample.

DISCLOSURE

Technical Problem

An object of the present invention is to provide an automated atomic force microscope using artificial intelligence technology and an operation method thereof.

Technical Solution

In order to accomplish the above object, an atomic force microscope of the present invention may include a sample stage configured to allow a sample to be placed thereon, a cantilever, which is disposed above the sample and includes a probe tip, a laser configured to radiate a laser beam to the cantilever, a photodetector configured to receive a laser beam reflected from the cantilever, a first camera configured to photograph the sample and the cantilever, a second camera configured to photograph the cantilever and the spot of a laser beam radiated from the laser, and a processor electrically connected to the first camera, the second camera, and the photodetector in order to process data acquired by the first camera, the second camera, and the photodetector.

An operation method of an atomic force microscope of the present invention may include detecting the positions of a cantilever and a sample using a first camera, adjusting the position of the sample, detecting the positions of a laser and the cantilever using a second camera, aligning the laser, detecting the position of a laser beam using a photodetector, and aligning the position of the photodetector.

Advantageous Effects

According to an atomic force microscope and an operation method thereof according to the present invention, it is possible to automatically and accurately achieve alignment of the positions of a cantilever and a sample, alignment of the positions of the cantilever and a laser beam spot, and alignment of the positions of a laser beam and a photodetector, which require very fine and delicate adjustment tasks. Conventionally, such adjustment tasks are manually performed, which is time-consuming, leads to deterioration in the accuracy of alignment due to errors in the alignment process by operators, and incurs a risk of damage to parts such as the cantilever or the sample. However, according to the present invention, it is possible to automatically and accurately align parts of the atomic force microscope and to reduce the risk of damage to parts thereof. Further, it is possible to acquire highly reliable images using the atomic force microscope of the present invention.

DESCRIPTION OF DRAWINGS

The above and other objects, features, and other advantages of the present invention will be more clearly understood from the following detailed description taken in conjunction with the accompanying drawings, in which.

BEST MODE

Hereinafter, various embodiments of the present disclosure will be described with reference to the accompanying drawings. However, the technology set forth herein should not be construed as being limited to the exemplary embodiments and terms used in the exemplary embodiments, and should be understood as including various modifications, equivalents, and/or alternatives of the exemplary embodiments.

Reference will now be made in detail to the preferred embodiments of the present invention, examples of which are illustrated in the accompanying drawings.

Figure 1:
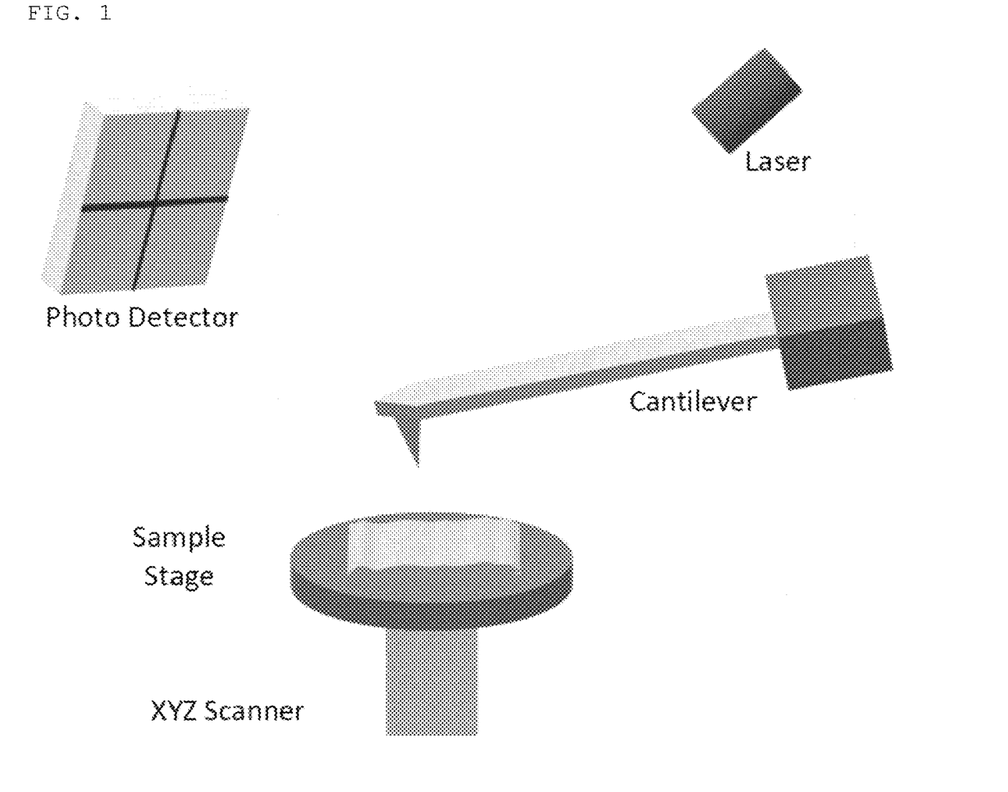
FIG. 1 is a mimetic diagram of an atomic force microscope.

First, referring to FIG. 1, an atomic force microscope may include a sample stage configured to allow a sample to be placed thereon, a cantilever including a probe tip, a laser configured to radiate a laser beam, and a photodetector configured to receive a reflected laser beam.

Hereinafter, an atomic force microscope according to an embodiment of the present invention will be described in more detail with reference to FIG. 2.

Figure 2:
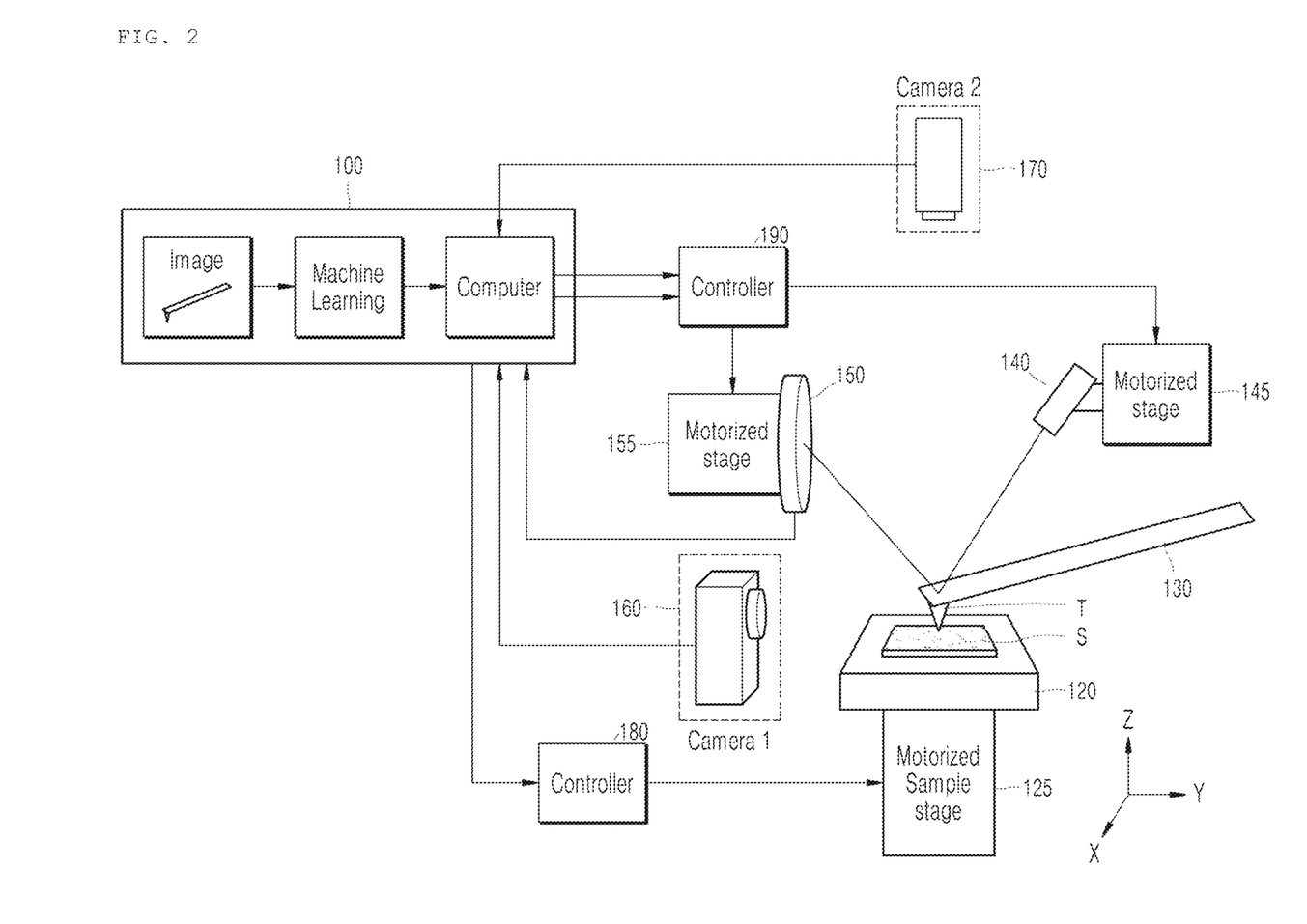
FIG. 2 is a mimetic diagram of an atomic force microscope according to an embodiment of the present invention.

Referring to FIG. 2, an atomic force microscope according to an embodiment of the present invention includes a sample stage 120 configured to allow a sample S to be placed thereon, a sample stage position adjustor (or a motorized sample stage) 125 configured to adjust the position of the sample stage 120, a cantilever 130 including a probe tip T, a laser 140 configured to radiate a laser beam to the cantilever 130, a laser position adjustor (or a motorized stage) 145 configured to adjust the position of the laser 140, a photodetector 150 configured to receive the laser beam reflected from the cantilever 130, a photodetector position adjustor (or a motorized stage) 155 configured to adjust the position of the photodetector 150, a first camera 160, a second camera 170, controllers 180 and 190, and a processor 100.

The first camera 160 may be disposed so as to photograph the sample S and the cantilever 130. The second camera 170 may be disposed so as to photograph the cantilever 130 and the spot of the laser beam radiated from the laser 140.

The processor 100 may be electrically connected to the first camera 160, the second camera 170, and the photodetector 150, and may process the data acquired by the first camera 160, the second camera 170, and the photodetector 150. The processor 100 may store various artificial intelligence object recognition programs in order to process the data acquired by the first camera 160, the second camera 170, and the photodetector 150. For example, the processor 100 may store programming software to control various components of the atomic force microscope. In addition, the processor 100 may store an artificial intelligence object recognition program such as a machine-learning program capable of identifying and detecting the structure of a target based on the images captured by the first camera 160 and the second camera 170. For example, "LabVIEW" may be used as the programming software, and "TensorFlow" may be used as the machine-learning program. However, the embodiments are not limited thereto, and various kinds of programming software and machine-learning programs for artificial intelligence object recognition technology may be stored in the processor 100.

The processor 100 may process various data to thereby adjust the positions of the sample stage 120, the laser 140, and the photodetector 150 using the controllers 180 and 190. Specifically, the processor 100 may be electrically connected to the controllers 180 and 190, and the controllers 180 and 190 may adjust the position of the sample stage 120 using the sample stage position adjustor 125, may adjust the position of the laser 140 using the laser position adjustor 145, and may adjust the position of the photodetector 150 using the photodetector position adjustor 155.

The processor 100 may acquire image data on the cantilever 130 and the sample S using the first camera 160. Meanwhile, the processor 100 may learn the shapes of the cantilever 130 and the sample S using the machine-learning program stored therein, thereby identifying the cantilever 130 and the sample S based on the image data on the cantilever 130 and the sample S and generating information about the positions thereof. The processor 100 may correct the positions of the cantilever 130 and the sample S using the information about the positions of the cantilever 130 and the sample S and pre-stored position information. That is, the processor 100 may compare the position information corresponding to the correct position of the probe tip T, provided at the end of the cantilever 130, on the surface of the sample S with the position information acquired from the current image data, and may generate information about the corrected positions if it is necessary to correct the current positions of the cantilever 130 and the sample S. The processor 100 may transmit the information about the corrected positions to the controller 180, and the controller 180 may adjust the position of the sample stage 120 to the corrected position using the sample stage position adjustor 125.

The processor 100 may acquire image data on the cantilever 130 and the spot of the laser beam radiated from the laser 140 using the second camera 170. Meanwhile, the processor 100 may learn the shapes of the cantilever 130 and the spot of the laser beam using the machine-learning program stored therein, thereby identifying the cantilever 130 and the spot of the laser beam based on the image data on the cantilever 130 and the spot of the laser beam and generating information about the positions thereof. The processor 100 may correct the positions of the cantilever 130 and the spot of the laser beam using the information about the positions of the cantilever 130 and the spot of the laser beam and pre-stored position information. That is, the processor 100 may compare the position information corresponding to the correct position of the spot of the laser beam on the end surface of the cantilever 130 with the position information acquired from the current image data, and may generate information about the corrected positions if it is necessary to correct the current positions of the cantilever 130 and the spot of the laser beam. The processor 100 may transmit the information about the corrected positions to the controller 190, and the controller 190 may adjust the position of the laser 140 to the corrected position using the laser position adjustor 145. That is, the position of the laser 140 may be adjusted such that the spot of the laser beam is concentrated onto the end surface of the cantilever 130.

The processor 100 may acquire position data on the laser beam that is reflected from the cantilever 130 and incident on the photodetector 150 using the photodetector 150. Information about the corrected position of the laser beam may be generated using the position data on the laser beam and pre-stored position data. That is, the processor 100 may compare the position information corresponding to the center of the photodetector 150 with the information about the current position of the laser beam incident on the photodetector 150, and may generate information about the corrected position if it is necessary to correct the current position of the laser beam. The processor 100 may transmit the information about the corrected position to the controller 190, and the controller 190 may adjust the position of the photodetector 150 to the corrected position using the photodetector position adjustor 155. That is, the position of the photodetector 150 may be adjusted such that the laser beam reflected from the cantilever 130 is incident on the center of the photodetector 150.

Figure 3:
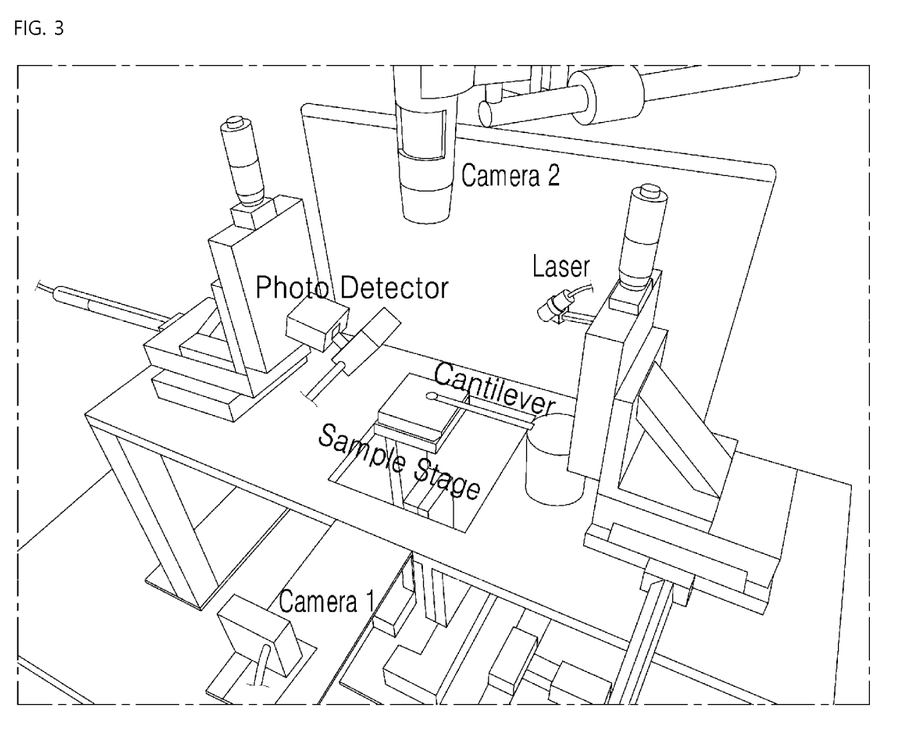
FIG. 3 is a picture showing an example of an atomic force microscope according to an embodiment of the present invention.

FIG. 3 is a picture showing an example of an atomic force microscope according to an embodiment of the present invention. Referring to FIG. 3, automation may be implemented by employing a first camera (Camera 1), a second camera (Camera 2), and artificial intelligence object recognition technology. Therefore, the atomic force microscope of the present invention is capable of automatically and accurately achieving alignment of the positions of the cantilever and the sample, alignment of the positions of the cantilever and the laser beam spot, and alignment of the positions of the laser beam and the photodetector, which require very fine and delicate adjustment tasks. In many conventional cases, such adjustment tasks are manually performed, which is time-consuming, leads to deterioration in the accuracy of alignment due to errors in the alignment process by operators, and incurs a risk of damage to parts such as the cantilever or the sample. In addition, because most conventional automated equipment realizes automation in a manner of indirectly detecting an object based on electronic signals, there is a possibility of malfunction and resultant damage to the cantilever or the sample. However, according to the present invention, it is possible to directly identify the structure of a target and to adjust the position of the target using artificial intelligence object recognition technology, thus exhibiting very high operational accuracy. In addition, according to the present invention, it is possible to automatically and accurately align parts of the atomic force microscope and to reduce the risk of damage to parts thereof. Further, it is possible to acquire highly reliable images using the atomic force microscope of the present invention.

Hereinafter, an operation method of the atomic force microscope according to an embodiment of the present invention will be described with reference to FIGS. 4 to 10.

Figure 4:
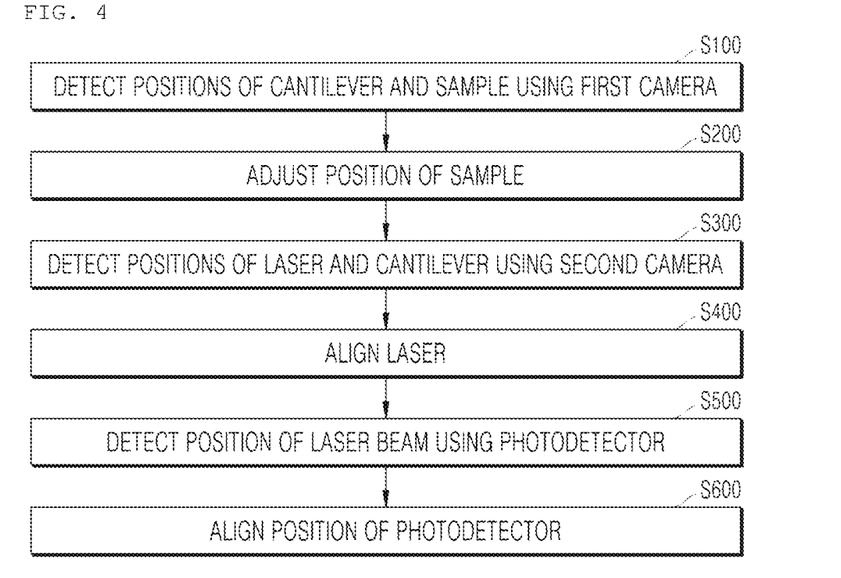
FIG. 4 is a flowchart of an operation method of the atomic force microscope according to an embodiment of the present invention.

Referring to FIG. 4, an operation method of the atomic force microscope according to an embodiment of the present invention may include a step of detecting the positions of the cantilever and the sample using the first camera (S100), a step of adjusting the position of the sample (S200), a step of detecting the positions of the laser and the cantilever using the second camera (S300), a step of aligning the laser (S400), a step of detecting the position of the laser beam using the photodetector (S500), and a step of aligning the position of the photodetector (S600).

Hereinafter, the operation method of the atomic force microscope according to the embodiment of the present invention will be described in more detail with reference to FIGS. 5 and 6.

Figure 5:
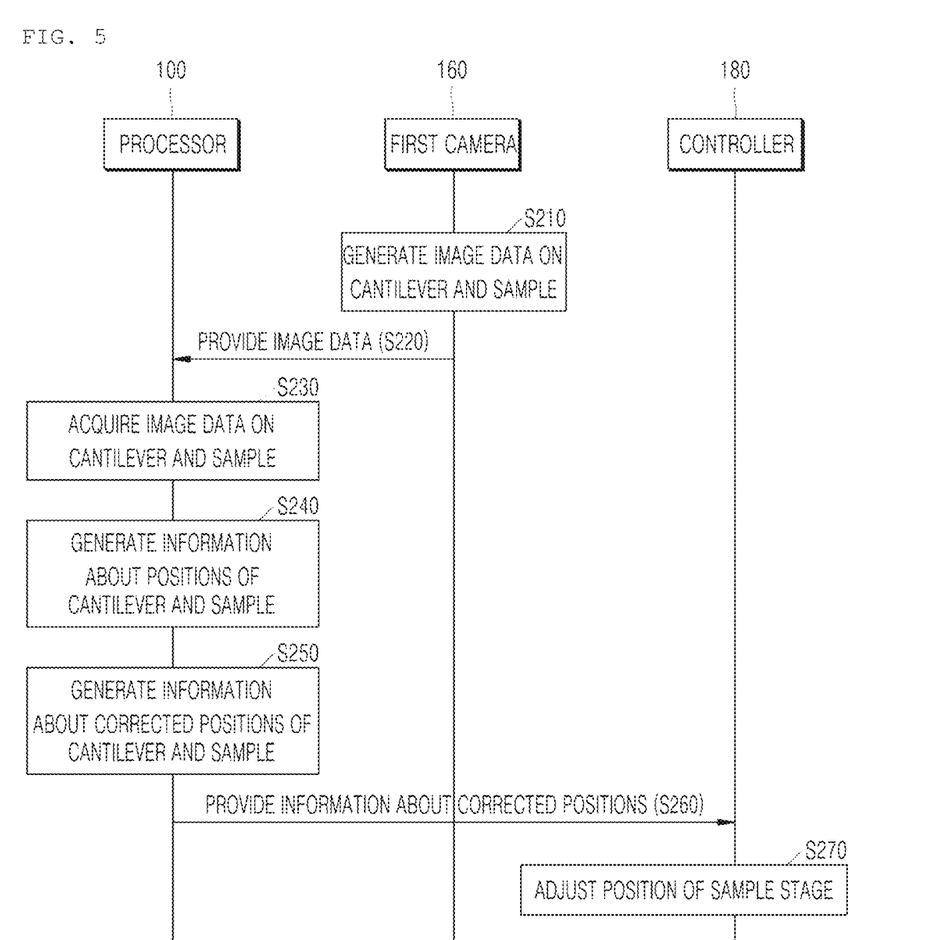
FIG. 5 is a flowchart of the operation method of the atomic force microscope according to the embodiment of the present invention.
Figure 6:
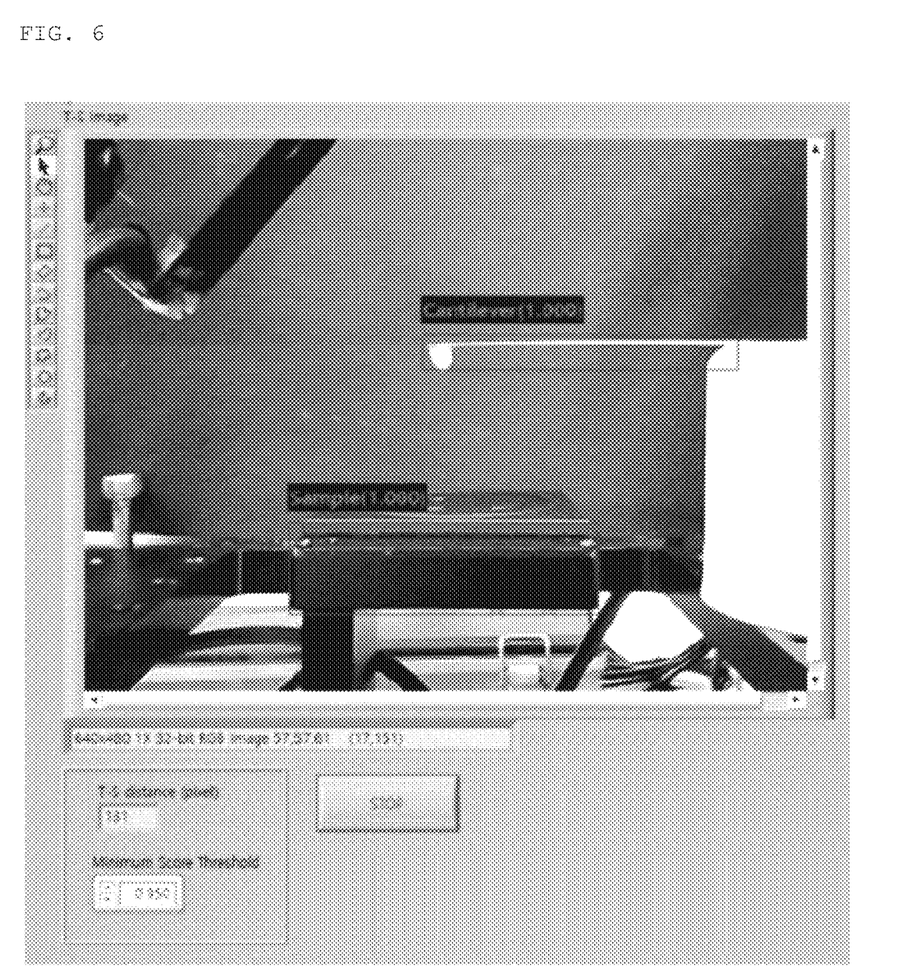
FIG. 6 is a picture for explaining the operation method of the atomic force microscope according to the embodiment of the present invention.

Referring to FIG. 5, the first camera 160 may photograph the sample S and the cantilever 130 using the image sensor, and may generate image data on the cantilever 130 and the sample S (S210). The image data may be provided to the processor 100 (S220). The processor 100 may acquire the image data on the cantilever 130 and the sample S (S230), and may generate information about the positions of the cantilever 130 and the sample S (S240). Subsequently, the processor 100 may generate information about the corrected positions of the cantilever 130 and the sample S using the information about the positions of the cantilever 130 and the sample S and pre-stored position information (S250). The processor 100 may provide the information about the corrected positions to the controller 180 (S260). The controller 180 may adjust the position of the sample stage 120 using the information about the corrected positions (S270). Meanwhile, as shown in FIG. 6, the processor 100 may perform the above-described operation using a program capable of detecting the positions of the cantilever 130 and the sample S.

Figure 7:
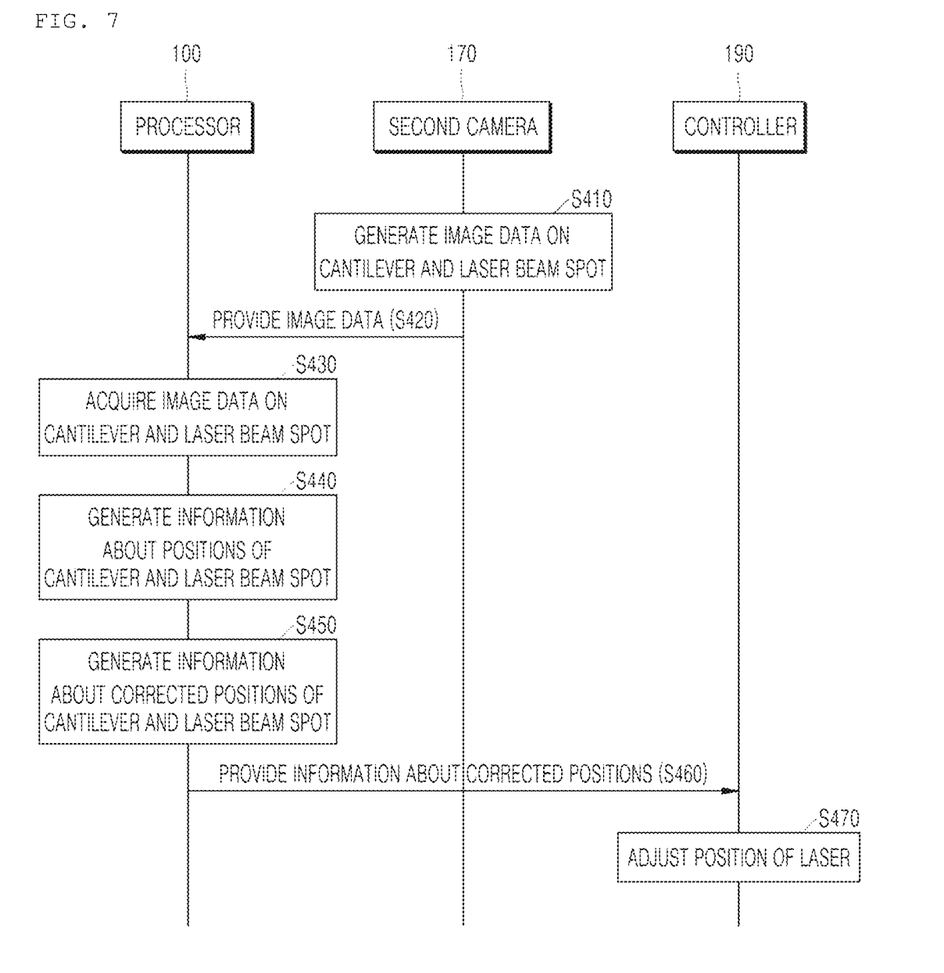
FIG. 7 is a flowchart of the operation method of the atomic force microscope according to the embodiment of the present invention.
Figure 8:
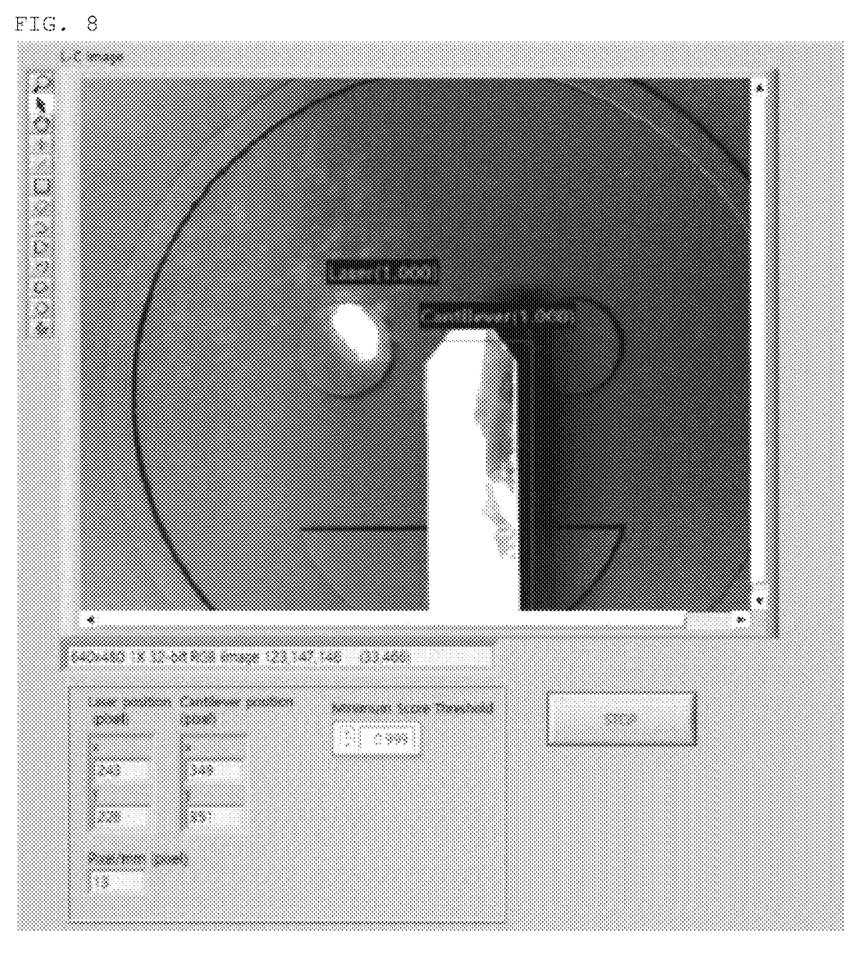
FIG. 8 is a picture for explaining the operation method of the atomic force microscope according to the embodiment of the present invention.

Referring to FIG. 7, the second camera 170 may photograph the cantilever 130 and the spot of the laser beam radiated from the laser 140, and may generate image data on the cantilever 130 and the spot of the laser beam (S410). The image data may be provided to the processor 100 (S420). The processor 100 may acquire the image data on the cantilever 130 and the spot of the laser beam (S430), and may generate information about the positions of the cantilever 130 and the spot of the laser beam (S440). Subsequently, the processor 100 may generate information about the corrected positions of the cantilever 130 and the spot of the laser beam using the information about the positions of the cantilever 130 and the spot of the laser beam and pre-stored position information (S450). The processor 100 may provide the information about the corrected positions to the controller 190 (S460). The controller 190 may adjust the position of the laser 140 using the information about the corrected positions (S470). Meanwhile, as shown in FIG. 8, the processor 100 may perform the above-described operation using a program capable of detecting the positions of the cantilever 130 and the spot of the laser beam.

Figure 9:
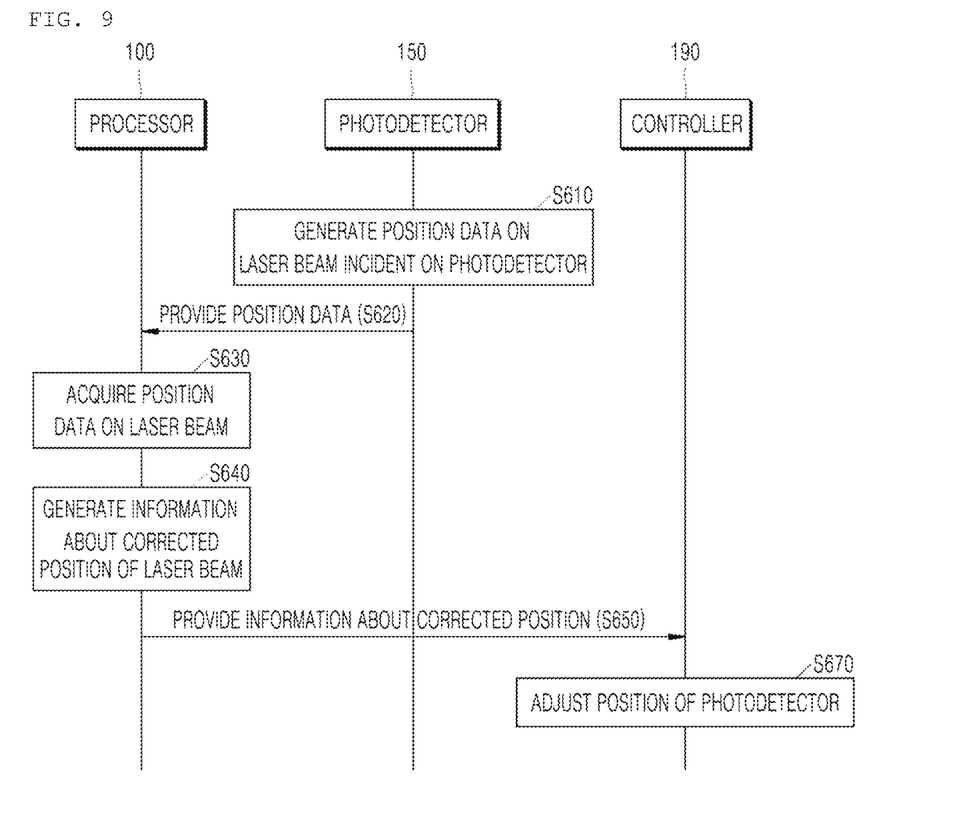
FIG. 9 is a flowchart of the operation method of the atomic force microscope according to the embodiment of the present invention.
Figure 10:
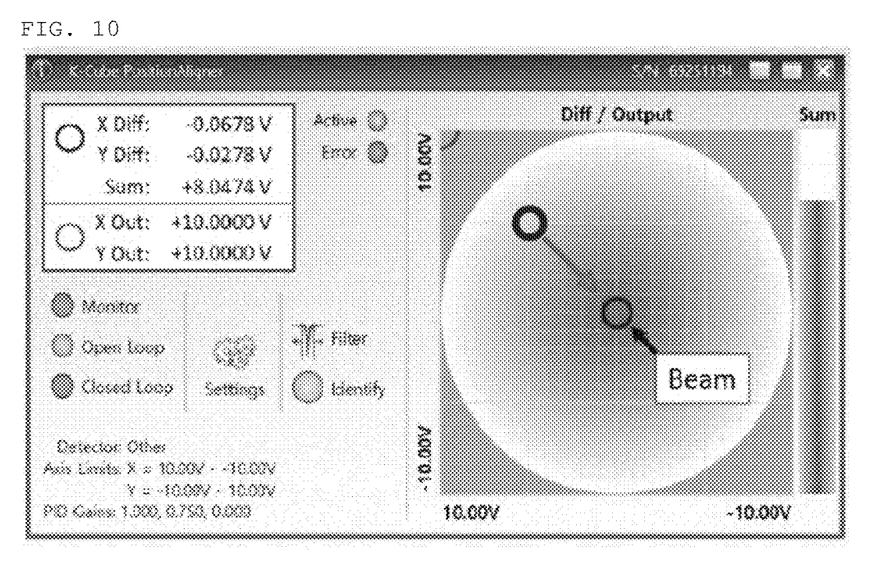
FIG. 10 is a picture for explaining the operation method of the atomic force microscope according to the embodiment of the present invention.

Referring to FIG. 9, the photodetector 150 may generate position data on the laser beam that is reflected from the cantilever 130 and incident on the photodetector 150 (S610). The position data may be provided to the processor 100 (S620). The processor 100 may generate information about the corrected position of the laser beam using the position data on the laser beam and pre-stored position data (S640). The processor 100 may provide the information about the corrected position to the controller 190 (S650). The controller 190 may adjust the position of the photodetector 150 using the information about the corrected position (S670). Meanwhile, as shown in FIG. 10, the processor 100 may perform the above-described operation using a program capable of detecting the position of the laser beam.

While the present invention has been particularly shown and described with reference to exemplary embodiments thereof, it will be understood by those skilled in the art that various changes in form and details may be made without departing from the essential characteristics of the present invention. Therefore, the exemplary embodiments should be considered in a descriptive sense only and not for purposes of limitation. The scope of the present invention is defined not by the detailed description of the present invention but by the appended claims, and all differences that fall within the scope equivalent thereto should be construed as being included in the scope of the present invention.

INDUSTRIAL APPLICABILITY

According to the present invention, it is possible to automatically and accurately align parts of an atomic force microscope and to reduce the risk of damage to parts thereof. Further, it is possible to acquire highly reliable images using the atomic force microscope of the present invention. Accordingly, the present invention has high industrial applicability.

The invention claimed is:

1. An atomic force microscope comprising:
a sample stage configured to allow a sample to be placed thereon;
a cantilever disposed above the sample, the cantilever including a probe tip;
a laser configured to radiate a laser beam to the cantilever;
a photodetector configured to receive a laser beam reflected from the cantilever;
a first camera configured to photograph the sample and the cantilever;
a second camera configured to photograph the cantilever and a spot of a laser beam radiated from the laser; and
a processor electrically connected to the first camera, the second camera, and the photodetector, the processor processing data acquired by the first camera, the second camera, and the photodetector.

2. The atomic force microscope according to claim 1, wherein the processor acquires image data on the cantilever and the sample using the first camera and generates information about positions of the cantilever and the sample based on the image data.

3. The atomic force microscope according to claim 1, wherein the processor generates information about corrected positions of the cantilever and the sample based on information about positions of the cantilever and the sample and pre-stored position information.

4. The atomic force microscope according to claim 1, wherein the processor adjusts a position of the sample stage using a controller based on information about corrected positions of the cantilever and the sample.

5. The atomic force microscope according to claim 1, wherein the processor acquires image data on the cantilever and the spot of the laser beam using the second camera and generates information about positions of the cantilever and the spot of the laser beam based on the image data.

6. The atomic force microscope according to claim 1, wherein the processor generates information about corrected positions of the cantilever and the spot of the laser beam based on information about positions of the cantilever and the spot of the laser beam and pre-stored position information.

7. The atomic force microscope according to claim 1, wherein the processor adjusts a position of the laser using a controller based on information about corrected positions of the cantilever and the spot of the laser beam.

8. The atomic force microscope according to claim 1, wherein the processor acquires position data on a laser beam incident on the photodetector using the photodetector and generates information about a corrected position of the laser beam based on the position data and pre-stored position data.

9. The atomic force microscope according to claim 1, wherein the processor adjusts a position of the photodetector using a controller based on information about a corrected position of the laser beam.

10. An operation method of an atomic force microscope, the operation method comprising:
detecting positions of a cantilever and a sample using a first camera;
adjusting a position of the sample;
detecting positions of a laser and the cantilever using a second camera;
aligning the laser;
detecting a position of a laser beam using a photodetector; and
aligning a position of the photodetector.

11. The operation method according to claim 10 further comprising:
acquiring image data on a cantilever and a sample using a first camera;
generating information about positions of the cantilever and the sample based on the image data on the cantilever and the sample;
generating information about corrected positions of the cantilever and the sample based on the information about the positions of the cantilever and the sample and pre-stored position information; and
adjusting a position of a sample stage using a controller based on the information about the corrected positions of the cantilever and the sample.

12. The operation method according to claim 10 further comprising:
acquiring image data on a cantilever and a spot of a laser beam using a second camera;
generating information about positions of the cantilever and the spot of the laser beam based on the image data on the cantilever and the spot of the laser beam;
generating information about corrected positions of the cantilever and the spot of the laser beam based on the information about the positions of the cantilever and the spot of the laser beam and pre-stored position information; and
adjusting a position of a laser using a controller based on the information about the corrected positions of the cantilever and the spot of the laser beam.

13. The operation method according to claim 10 further comprising:
acquiring position data on a laser beam incident on a photodetector using the photodetector;
generating information about a corrected position of the laser beam using the position data on the laser beam and pre-stored position data; and
adjusting a position of the photodetector using a controller based on the information about the corrected position of the laser beam.

* * * * *